(12) United States Patent
Gao et al.

(10) Patent No.: US 11,552,687 B2
(45) Date of Patent: Jan. 10, 2023

(54) CSI REPORTING FOR MULTIPLE TRP TRANSMISSION/PANEL

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/252,117

(22) PCT Filed: Jun. 15, 2018

(86) PCT No.: PCT/CN2018/091527
§ 371 (c)(1),
(2) Date: Dec. 14, 2020

(87) PCT Pub. No.: WO2019/237339
PCT Pub. Date: Dec. 19, 2019

(65) Prior Publication Data
US 2021/0258060 A1   Aug. 19, 2021

(51) Int. Cl.
*H04B 7/06* (2006.01)
*H04L 5/00* (2006.01)

(52) U.S. Cl.
CPC ........... *H04B 7/0626* (2013.01); *H04B 7/063* (2013.01); *H04B 7/0632* (2013.01); *H04L 5/0048* (2013.01)

(58) Field of Classification Search
CPC .... H04B 7/0626; H04B 7/063; H04B 7/0632; H04B 7/022; H04L 5/0048; H04L 5/0057
See application file for complete search history.

(56) References Cited

U.S. PATENT DOCUMENTS

| 2012/0051257 | A1  | 3/2012 | Kim et al. |
| 2019/0222279 | A1* | 7/2019 | Xi ................. H04B 7/0695 |
| 2019/0268782 | A1* | 8/2019 | Martin ............ H04W 36/0094 |

FOREIGN PATENT DOCUMENTS

| CN | 107836086 A    | 3/2018 |
| JP | 2015-092673 A  | 5/2015 |
| JP | 2016-525808 A  | 8/2016 |
| JP | 2017-77025 A   | 4/2017 |
| WO | 2017/136749 A1 | 8/2017 |
| WO | 2018/028182 A1 | 2/2018 |

(Continued)

OTHER PUBLICATIONS

International Search Report for PCT/CN2018/091527 dated Feb. 27, 2019 [PCT/ISA/210].

(Continued)

*Primary Examiner* — Minh Trang T Nguyen
(74) *Attorney, Agent, or Firm* — Sughrue Mion, PLLC (57) ABSTRACT

Embodiments of the present disclosure relate to methods, devices and apparatuses of channel state information (CSI) reporting for multiple reception point (TRP) transmission. In an embodiment of the present disclosure, a method may include transmitting a first CSI report on a first TRP of multiple TRPs serving a terminal device for a channel state information reference signal (CSI-RS) resource set for CSI acquisition. The method may further include transmitting a second CSI report on a second TRP of the multiple TRPs serving the terminal device for the CSI-RS resource set. With embodiments of the present disclosure, it is possible to support CSI reporting for multiple TRP transmission.

5 Claims, 5 Drawing Sheets

| TRP1 | TRP2 | TRP1 | TRP2 | TRP1 | TRP2 | TRP1 | TRP2 | TRP1 | TRP2 | TRP1 | TRP2 | TRP1 | TRP2 | TRP1 | TRP2 |
|------|------|------|------|------|------|------|------|------|------|------|------|------|------|------|------|
| 1    | 0    | 2    | 0    | 3    | 0    | 4    | 0    | 5    | 0    | 6    | 0    | 7    | 0    | 8    | 0    |
| 1    | 1    | 2    | 1    | 3    | 2    | 4    | 3    |      |      |      |      |      |      |      |      |
| 1    | 2    | 2    | 2    | 3    | 3    | 4    | 4    |      |      |      |      |      |      |      |      |
|      |      | 2    | 3    | 3    | 4    |      |      |      |      |      |      |      |      |      |      |

(56) References Cited

FOREIGN PATENT DOCUMENTS

| | | |
|---|---|---|
| WO | 2018/031924 A1 | 2/2018 |
| WO | 2018/229078 A1 | 12/2018 |

OTHER PUBLICATIONS

Written Opinion for PCT/CN2018/091527 dated Feb. 27, 2019 [PCT/ISA/237].
Notification of Reasons for Refusal dated May 31, 2022 from the Japanese Patent Office in Japanese Application No. 2020-569763.
Decision to Grant a Patent dated Aug. 30, 2022 in Japanese Application No. 2020-569763.

* cited by examiner

| TRP1 | TRP2 | TRP1 | TRP2 | TRP1 | TRP2 | TRP1 | TRP2 | TRP1 | TRP2 | TRP1 | TRP2 | TRP1 | TRP2 |
|---|---|---|---|---|---|---|---|---|---|---|---|---|---|
| 1 | 0 | 2 | 0 | 3 | 0 | 4 | 0 | 5 | 0 | 6 | 0 | 7 | 0 | 8 | 0 |
| 1 | 1 | 2 | 1 | 3 | 2 | 4 | 3 | | | | | | |
| 1 | 2 | 2 | 2 | 3 | 3 | 4 | 4 | | | | | | |
| | | 2 | 3 | 3 | 4 | | | | | | | | |

FIG. 4

| TRP1 | TRP2 | TRP1 | TRP2 | TRP1 | TRP2 | TRP1 | TRP2 | TRP1 | TRP2 | TRP1 | TRP2 | TRP1 | TRP2 |
|---|---|---|---|---|---|---|---|---|---|---|---|---|---|
| 1 | 0 | 2 | 0 | 3 | 0 | 4 | 0 | 5 | 0 | 6 | 0 | 7 | 0 | 8 | 0 |
| 1 | 1 | 2 | 1 | 3 | 2 | 4 | 3 | | | | | | |
| 1 | 2 | 2 | 2 | 3 | 3 | 4 | 4 | | | | | | |
| | | 2 | 3 | 3 | 4 | | | | | | | | |

CSI REPORTING FOR MULTIPLE TRP TRANSMISSION/PANEL

CROSS REFERENCE TO RELATED APPLICATIONS

This application is a National Stage of International Application No. PCT/CN2018/091527 filed Jun. 15, 2018.

FIELD OF THE INVENTION

The non-limiting and exemplary embodiments of the present disclosure generally relate to the field of wireless communication techniques, and more particularly relate to methods, devices and apparatuses for transmitting a channel state information (CSI) report for multiple transmission reception point (TRP) transmission and receiving a CSI report for multiple TRP transmission.

BACKGROUND OF THE INVENTION

New radio access system, which is also called as NR system or NR network, is the next generation communication system. In Radio Access Network (RAN) #71 meeting for the third generation Partnership Project (3GPP) working group, study of the NR system was approved. The NR system will consider frequency ranging up to 100 Ghz with an object of a single technical framework addressing all usage scenarios, requirements and deployment scenarios defined in Technical Report TR 38.913, which includes requirements such as enhanced mobile broadband, massive machine-type communications, and ultra-reliable and low latency communications.

A discussion on multi-antenna technologies for the NR was started since May 2016 and it involves several aspects including multi-antenna scheme, beam management, Channel State Information (CSI) acquisition, and reference signal and quasi-co-located (QCL). Both single TRP transmission and multiple TRP transmission were agreed in the NR system.

Regarding the codeword (CW) to layer mapping in NR, it was already agreed that:
NR supports the following number of CWs per PDSCH/PUSCH assignment per UE:
  For 1 to 4-layer transmission: 1 CW
  For 5 to 8-layer transmission: 2 CWs
Confirm the following working assumption as an agreement:
  For 3 and 4-layer transmission, NR supports 1 CW per Physical Downlink Shared Channel (PDSCH)/Physical Uplink Shared Channel PUSCH assignment per UE
    For Further Study (FFS): the support of mapping 2-CW to 3 layers and 2-CW to 4 layers
DMRS port groups belonging to one CW can have different QCL assumptions
One Uplink (UL)—or Downlink (DL)-related Downlink Control Indication (DCI) includes one Modulation and Coding Scheme (MCS) per CW.
One Channel Quality Indication (CQI) is calculated per CW With regard to CSI reporting in NR, it was also agreed to add the following content:
"When UE is configured with the higher layer parameter ReportQuantity set to 'CSI-RS Resource Indication (CRI)/Rank Indication(RI)/Precoding Matrix Indicator (PMI)/Channel Quality Indicator(CQI)', 'CRT/RI/i1', 'CRI/RI/i1/CQI', 'CRI/RI/CQI' or 'CRI/RI/Layer indicator(LI)/PMI/CQI', and multiple resources are configured in the corresponding resource set for channel measurement, the UE shall derive the CSI parameters other than CRI conditioned on the reported CRI."

Regarding single and multiple PDSCH from separate TRPs, it was further agreed that
  Adopt the following for NR reception:
    A single NR-PDCCH schedules a single NR-PDSCH where separate layers are transmitted from separate TRPs
    Multiple NR-PDCCHs each scheduling a respective NR-PDSCH where each NR-PDSCH is transmitted from a separate TRP
    Note: the case of single NR-PDCCH scheduling single NR-PDSCH where each layer is transmitted from all TRPs jointly can be done in a spec-transparent manner
    Note: CSI feedback details for the above case can be discussed separately Multiple TRPs/panels transmission was down-prioritized and thus not discussed in details in Rel. 15. Thus, the current NR, CSI-RS configuration and TCI state configuration are based on single TRP/panel. For the multiple TRP transmission, TRPs are not QCLed and thus solutions of the CSI measurement and reporting for the single TRP transmission cannot applied to the multiple TRP transmission.

SUMMARY OF THE INVENTION

To this end, in the present disclosure, there is provided a new solution of CSI reporting for multiple TRP transmission, to mitigate or at least alleviate at least part of the issues in the prior art. It is to be understood that the idea disclosed herein may also be used for multiple panel transmission, wherein panel is a group of antennas.

According to a first aspect of the present disclosure, there is provided a method for transmitting a CSI report for multiple TRP transmission. The method may include, transmitting a first CSI report on a first TRP of multiple TRPs serving a terminal device for a channel state information reference signal (CSI-RS) resource set for CSI acquisition; and transmitting a second CSI report on a second TRP of the multiple TRPs serving the terminal device for the CSI-RS resource set.

According to a second aspect of the present disclosure, there is provided a method for receiving a CSI report for multiple TRP transmission. The method may include receiving a first CSI report on a first TRP of multiple TRPs serving a terminal device for a channel state information reference signal (CSI-RS) resource set for CSI acquisition and receiving a second CSI report on a second TRP of multiple TRPs serving the terminal device for the CSI-RS resource set.

According to a third aspect of the present disclosure, there is provided a terminal device, wherein the terminal device is configured for transmitting a CSI report for multiple TRP transmission. The terminal device may include a transceiver, and a processor, configured to control the transceiver to, transmit a first CSI report on a first TRP of multiple TRPs serving a terminal device for a channel state information reference signal (CSI-RS) resource set for CSI acquisition, and transmit a second CSI report on a second TRP of the multiple TRPs serving the terminal device for the CSI-RS resource.

According to a fourth aspect of the present disclosure, there is provided a network device, wherein the network device is configured to receive a CSI report for multiple TRP transmission. The network device may include a transceiver; and a processor, configured to control the transceiver to: receive a first CSI report on a first TRP of multiple TRPs serving a terminal device for a channel state information reference signal (CSI-RS) resource set for CSI acquisition, and receive a second CSI report on a second TRP of multiple TRPs serving the terminal device for the CSI-RS resource set.

According to a fifth aspect of the present disclosure, there is provided a terminal device. The terminal device may comprise a processor and a memory. The memory may be coupled with the processor and having program codes therein, which, when executed on the processor, cause the terminal device to perform operations of the method according to any embodiment according to the first aspect.

According to a sixth aspect of the present disclosure, there is provided a network device. The network device may comprise a processor and a memory. The memory may be coupled with the processor and have program codes therein, which, when executed on the processor, cause the network device to perform operations of the method according to any embodiment according to the second aspect.

According to a seventh aspect of the present disclosure, there is provided a computer-readable storage media with computer program codes embodied thereon, the computer program codes configured to, when executed, cause an apparatus to perform actions of the method according to any embodiment in the first aspect.

According to an eighth aspect of the present disclosure, there is provided a computer-readable storage media with computer program codes embodied thereon, the computer program codes configured to, when executed, cause an apparatus to perform actions of the method according to any embodiment in the second aspect.

According to a ninth aspect of the present disclosure, there is provided a computer program product comprising a computer-readable storage media according to the seventh aspect.

According to a tenth aspect of the present disclosure, there is provided a computer program product comprising a computer-readable storage media according to the eighth aspect.

With embodiments of the present disclosure, it is possible to support CSI reporting for multiple TRP transmission. In some embodiments, it may further reduce signaling overhead of the CSI report.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein.

DETAILED DESCRIPTION OF EMBODIMENTS

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, user equipment (UE) may refer to a terminal, a Mobile Terminal (MT), a subscriber station, a portable subscriber station, Mobile Station (MS), or an Access Terminal (AT), and some or all of the functions of the UE, the terminal, the MT, the SS, the portable subscriber station, the MS, or the AT may be included. Furthermore, in the context of the present disclosure, the term "BS" may represent, e.g., a node B (NodeB or NB), an evolved NodeB (eNodeB or eNB), gNB (next generation Node B), a radio header (RH), a remote radio head (RRH), a relay, or a low power node such as a femto, a pico, and so on.

As mentioned in Background, in Rel. 15 of the NR system, CSI-RS configuration and TCI state configuration are based on single TRP/panel. In NR, it was agreed for the CSI report that the same sequence is used for one PDSCH for DL DMRS design. Specifically, when UE is configured with a CSI-ReportConfig with the higher layer parameter ReportQuantity set to 'cri-RSRP', 'cri-RI-PMI-CQI', 'cir-RI-i1', 'cir-RI-i1-CQI', 'cir-RI-CQI' or 'cri-RI-LI-PMI-CQI', and Ks>1 resources are configured in the corresponding resource set for channel measurement, the UE shall derive the CSI parameters other than CRI conditioned on the reported CRI, wherein CRI k (k>=0) corresponds to the configured (k+1)-th entry of associated nzp-CSI-Resource in the corresponding nzp-CSI-RS-ResourceSet for channel measurement, and (k+1)-th entry of associated csi-IM-Resource in the corresponding csi-IM-ResourceSet (if configured) If Ks=2CSI-RS resources are configured, each resource shall contain at most 16 CSI-RS ports. If 2<Ks<=8 CSI-RS resources are configured, each resource shall contain at most CSI_RS ports.

For illustrative purposes, Table 1 illustrates the CSI report structure in NR system.

TABLE 1

CSI report structure in NR system

| Field | Bitwidth |
|---|---|
| Rank Indicator | $\min(2, \lceil \log_2 n_{RI} \rceil)$ |
| Layer Indicator | $\min(2, \lceil \log_2 RI \rceil)$ |
| Wide-band CQI | 4 |
| Sub-band differential CQI | 2 |
| CRI | $\lceil \log_2(K_s^{CSI-RS}) \rceil$ |

For a multiple TRP transmission, TRPs are not QCLed and thus solutions of the CSI measurement and reporting for singling TRP transmission cannot applied to the multiple TRP/panel transmission.

Embodiments of the present disclosure provide a solution of CSI reporting. The basic idea is to transmit, by a terminal device, multiple CSI reports for a CSI-RS resource set for CSI acquisition. By means of the multiple CSI reports, it may enable multiple TRP/panel transmission for a terminal device. In addition, it is also proposed an offset value indication to reduce CSI signaling overhead.

In some embodiments of the present disclosure, the terminal device transmits a first CSI report on a first TRP of multiple TRPs serving the terminal device for a CSI-RS resource set for CSI acquisition; and transmits a second CSI report on a second TRP of the multiple TRPs serving the terminal device for the CSI-RS resource set. The network device receives the first CSI report on the first TRP and the second CSI report on the second TRP, and obtains CSI information from the two reports. It is to be understood that the basic idea disclosed herein may also be used for multiple panel transmission, wherein a panel denotes a group of antennas on the network device and/or user terminal device and the multiple panel transmission means transmission using multiple panels for single user device. When the basic idea is used for the multiple panel transmission, the CSI measurement and the CSI reporting will be made for respective panels instead of TRPs for multiple TRP transmission.

Hereinafter, reference will be made to FIGS. 2 to 9 to describe solutions as proposed in the present disclosure in details by taking multiple TRP transmission as an example. However, it shall be appreciated that following embodiments are given only for illustrative purposes and the present disclosure is not limited thereto. Especially, different embodiments as described herein can be implemented alone and separately or combined in any suitable manner as long as it is feasible from a point of the technical view.

Figure 1:
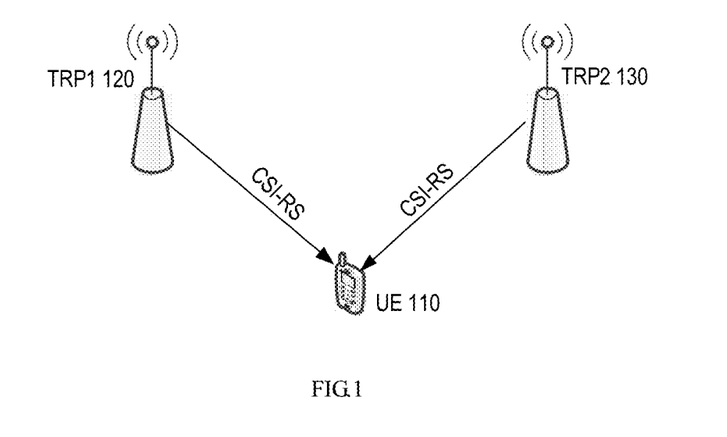
FIG. 1 illustrates an example scenario of multiple TRP transmission in which the present disclosure can be implemented.
Figure 2:
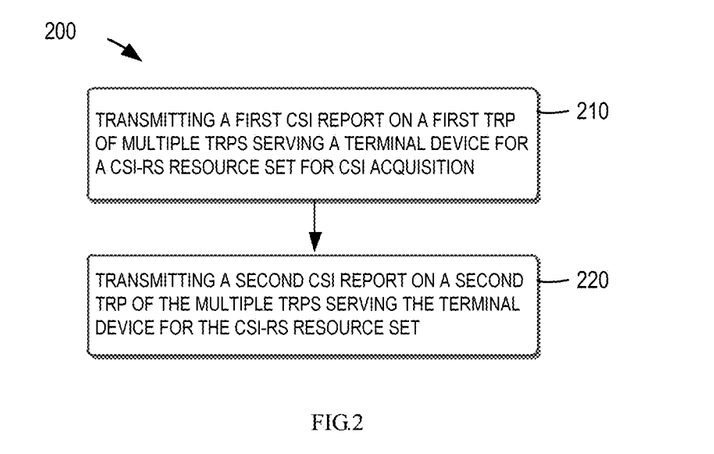
FIG. 2 illustrates a flow chart of a method for transmitting a CSI report for multiple TRP transmission at a terminal device according to some embodiments of the present disclosure.

FIG. 2 schematically illustrates a flow chart of a method for transmitting CSI report for multiple TRP transmission at a terminal device according to some embodiments of the present disclosure. The method 200 may be performed at a terminal device, for example a terminal device like UE, or other like devices.

As illustrated in FIG. 2, in step 210, the terminal device transmits a first CSI report on a first TRP of multiple TRPs serving a terminal device for CSI-RS resource set for CSI acquisition.

CSI reporting can be configured by the network device. For example, the CSI report could be transmitted periodically, or semi-persistently or alternatively, the CSI report could be transmitted upon receipt of a reporting request from the network device. When it is the time to report the CSI or upon receipt of a reporting request, the terminal device may select a CSI-RS resource for each TRP involved in the multiple TRP transmission from one CSI-RS resource set. The terminal device then performs CSI measurement using the selected CSI-RS resource for each TRP to obtain CSI information for each TRP. For the one CSI-RS resource set for CSI acquisition, the terminal device can transmit multiple sets of CSI reports for multiple TRPs, for example one report per TRP.

Thus, the terminal device may transmit a first CSI report on the first TRP to the network device. The first CSI report could include CSI-RS resource indication (CRI) and rank indication (RI) for the first TRP. The CRI indicates the CSI-RS resource used by the terminal device for CSI acquisition or measurement. The RI indicates the maximum number of layers supported by the terminal device. In some embodiments of the present disclosure, the CSI report may also include any of precoding matrix indicator (PMI); channel quality indicator (CQI), and layer indication (LI), etc., for the first TRP. The PMI indicates an index of precoding matrix, the CQI indicates channel quality and LI indicates a layer with the best channel quality.

In step 220, the terminal device transmits a second CSI report on a second TRP of the multiple TRPs serving the terminal device for the CSI-RS resource set.

Similar to the first CSI report, the second CSI report could include CRI and rank indication RI for the second TRP. In some embodiments of the present disclosure, the CSI report may also include any of PMI, CQI, layer indication, etc., for the second TRP.

In some embodiment of the present disclosure, the first CSI report may contain a value of RI indicating the absolute RI for the first TRP and the second CSI report may use an offset value relative to the value of RI for the first TRP to indicate a value of RI for the second TRP. By this means, it is possible to reduce the signaling overhead of the CSI report.

For illustrative purposes, a two-TRP transmission will be taken as an example to describe embodiments regarding offset indication of RI.

Figure 3:
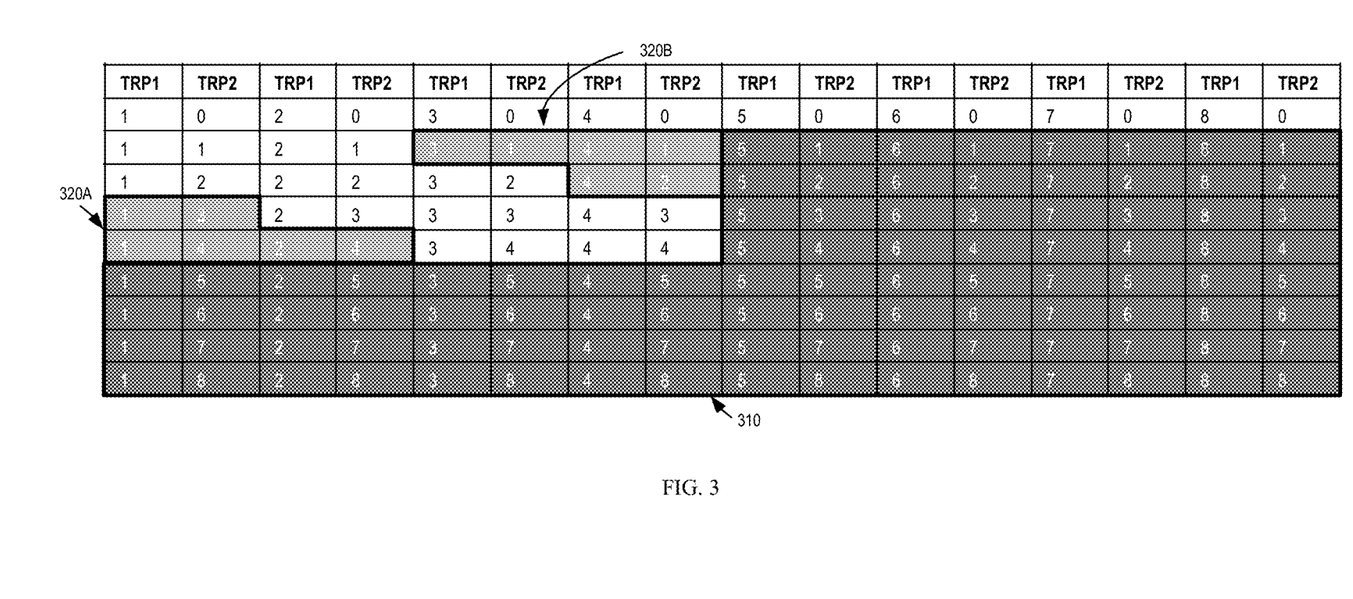
FIG. 3 illustrates possible combinations of numbers of layers for multiple TRP transmission involving two TRPs according to some embodiments of the present disclosure.

FIG. 3 illustrates possible combinations of numbers of layers for two TRP transmission involving two TRPs according to some embodiments of the present disclosure. According to current agreements, the NR system supports up to 8 layers transmission and thus combinations of numbers of layers for the two-TRP transmission could contain layers 1 to 8 of TRP 1 in combination with layer 0 to 8 of TPR 2, wherein layer 0 means TRP 2 does not involve the transmission. Thus, the possible combinations illustrated in FIG. 3 can be obtained.

However, according the current agreements, the total number of layers shall not be more than 8 and the number of codewords is not larger than 2. Thus, the communications indicated by reference sign 310 cannot be used. Furthermore, it may also further exclude some combinations by further limiting the difference between numbers of layers for two TRPs. In multiple TRP transmission, the two TRP may have substantially similar space multiplexing capacity and thus the layer difference of two TRPs can be constrained within one layer. Thus, combinations indicated by reference signs 320A and 320B cannot be used either.

Figure 4:
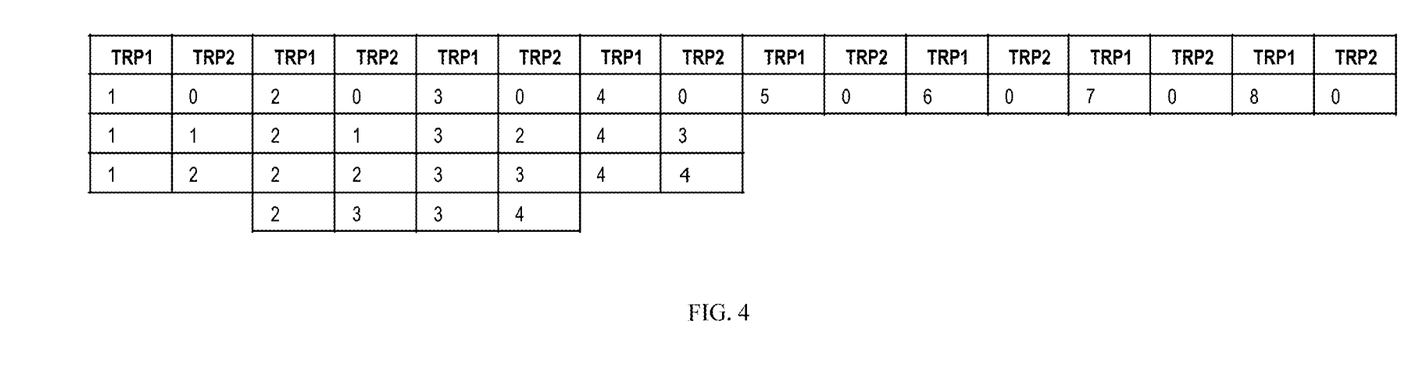
FIG. 4 illustrates example combinations of numbers of layers for multiple TRP transmission involving two TRPs according to some embodiments of the present disclosure.
Figure 5:
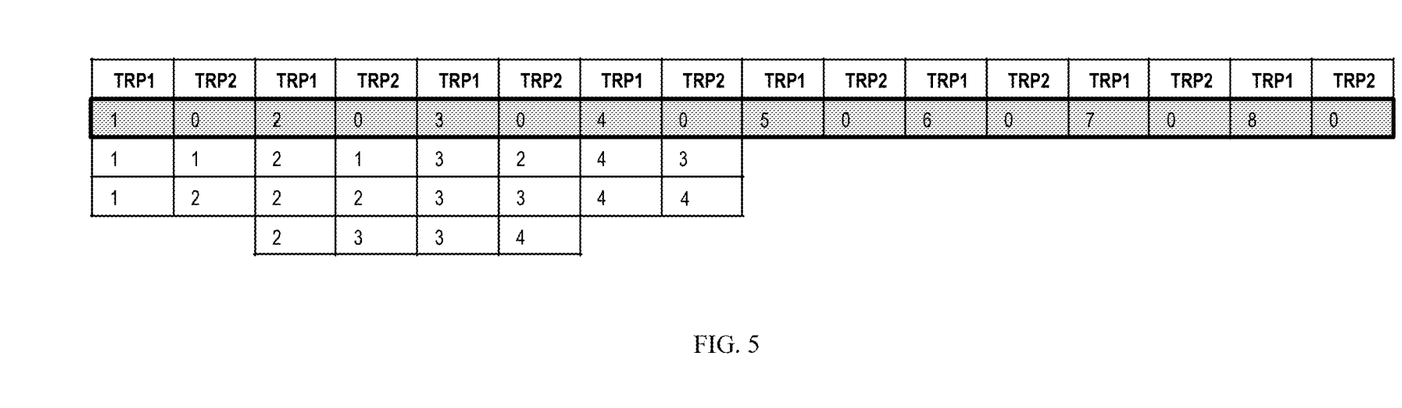
FIG. 5 illustrates example combinations of numbers of layers for multiple TRP transmission involving two TRPs according to some embodiments of the present disclosure.

After excluding these unusable combinations, we could obtain combinations as illustrated in FIG. 4. It shall be noticed that the combinations illustrated in FIG. 4 are only for illustrative purposes, and the present disclosure is not limited thereto. In some embodiments, it may only exclude combinations 310 and combinations 320A and 320B can still be contained in the final combinations. For illustrative purposes, embodiments of the present disclosure will be described with reference to combinations illustrated in FIG. 4.

In some embodiments of the present disclosure, the number of bits for CSI report may be dependent on at least one of following parameters: the number of ports for each CSI-RS resource (for example, denoted as P), the number of allowed RI values configured in Codebook Subset Restriction (CBSR) (for example, denoted as $n_{RI}$), and the number of CSI-RS resources in one CSI-RS resource set (for example, denoted as N).

For the CSI reporting, one of two CSI reports could contain an absolute value of RI. The value of RI may be restricted by Codebook Subset Restriction (CBSR). For the other of the two CSI report, the RI can be indicated with an offset value relative of the value of RI of the first TRP. For these combinations illustrated in FIG. 4, it could use 2 bits to indicate the offset value.

TABLE 2

Example Table for RI Offset

| RI offset | Value |
|---|---|
| 00 | −1 |
| 01 | 0 |
| 10 | 1 |
| 11 | Reserved or indicate that the RI for this CRI is 0 |

In Table 2, the offset could indicate a positive value, a negative value or zero. In other word, the offset could indicate a value of RI higher than, lower than or equal to the reported absolute value of rank indication. It could use "00", "01", "10" to indicate combinations other than those in the first row and use "11" indicate that the combinations in the first row in which one of the RI is 0. When the RI is indicated by an absolute value, it will require maximum 3 bits to indicate 0 layer to 4 layers or to indicate 1 layer to 8 layers; by means of the offset value, it only requires 2 bits to indicate the same range of RI. Thus, it could reduce the signaling overhead of CSI Report.

In some embodiments of the present disclosure, it may dynamically select one of the two TRPs for which the CSI contains the absolute value of RI and in such case; one TRP with a larger or lower value of rank indication can be selected as the TRP with RI indicated by an absolute value. Thus, the offset value could indicate a non-positive or non-negative value. In this way, it could support more combinations or to further reduce the signaling overhead.

Table 3 illustrates another example table for RI Offset according to some embodiments of the present disclosure.

TABLE 3

Example Table for RI Offset

| RI offset | Value |
|---|---|
| 00 | 0 |
| 01 | 1 |
| 10 | 2 or reserved |
| 11 | 3 Reserved or indicate that the RI for this CRI is 0 |

By means of this table, it could use "00", "01" to indicate combinations other than those in the first row and use for example "11" indicate that the combinations in the first row in which one of the RI is 0. In addition, it may also indicate a larger RI difference range, which means all or some of the excluded combinations 320A and 320B could be included in the final combinations.

In some embodiments of the present disclosure, one TRP with a larger value of rank indication can be selected as the TRP with RI indicated by an absolute value. This is feasible since the CRI could indicate index of CSI-RS. In such a way, the offset value could indicate a non-positive value. In other words, the offset value indicates a value of rank indication lower than or equal to the reported absolute value of rank indication. For example, if RI for TRP 1 is 2 and RI for TRP 2 is 3, then the RI with an absolute value 3 will be reported for TRP 2 and an offset value "1" will be reported for TRP 1. The value of RI for the TRP 1 can be determined as 2 (=3-1) based on the reported absolute value and the offset value. As another example, if RI for TRP 1 is 2 and RI for TRP 2 is 1, then the RI with an absolute value 2 will be reported for TRP 1 and an offset value "1" will be reported for TRP 2. The value of RI for the TRP 2 can be determined as 1 (=2-1) based on the reported absolute value and the offset value.

In some embodiments of the present disclosure, one TRP with a lower value of rank indication can be selected as the TRP with RI indicated by an absolute value. In such a way, the offset value could indicate a non-negative value. In other words, the offset value indicates a value of rank indication larger than or equal to the reported absolute value of rank indication. In this case, the value of RI with an offset value reported can be determined as the sum of the reported absolute value and the offset value.

Table 4 illustrates another example table for RI Offset according to some embodiments of the present disclosure, wherein only one bit is used.

TABLE 4

Example Table for RI Offset

| RI offset | Value |
|---|---|
| 00 | 0 |
| 01 | 1 |

By means of this table, it could use "0", "1" to indicate combinations other than those in the first row. While for the combinations in the first row as highlighted in FIG. 5 in which one of the RI is 0, it may use a different solution.

In some embodiments of the present disclosure, the reported of RI in two CSI reports may be a combination value. For example, for the two CSI reports, RI is reported with one field and the value of the field may indicate one combination of two RI values (first RI, second RI). In addition, the allowed number of combinations of first RI and second RI may be different based on different values of parameters from at least one of the number of ports for each CSI-RS resource (for example, denoted is P), the number of allowed RI values configured in Codebook Subset Restriction (CBSR) (for example, denoted nRI), and the number of CSI-RS resources in one CSI-RS resource set (for example, denoted N). In some embodiments, one report with a larger value of rank indication can be selected as the first value in the reported RI combination. In such a case, the first value in the reported RI combination may be no less than the second value in the reported RI combination, that is in the RI combination (first RI, second RI), first RI>=second RI, and then further overhead reduction can be achieved. In some embodiments, one report with a lower value of rank indication can be selected as the first value in the reported RI combination. In such a case, the first value in the reported RI combination may be no larger than the second value, that is in the RI combination (first RI, second RI), first RI<=second RI, then further overhead reduction can be achieved.

In some embodiments of the present disclosure, if the RI value is 0, which means there is no RI report for this TRP, this case can be indicated with other parameters, and no offset value is required to indicate the RI value "0". For example, it could report only one set of CSI with a non-zero RI value. One or more bits can be used to indicate whether one CSI report or multiple CSI reports are reported. For example, if only one CSI report is indicated, the total number of layers from the UE report is the value of the RI in the reported CSI report. If two CSI reports are indicated, the total number of layers from the UE report is the sum of the two actual RI values respectively contained in the two CSI reports. In addition, when multiple CSI reports are reported, the value of RI can be restricted to be not larger 4 in one set. Alternatively, it may also report two CSI reports with the same CSI information if one of two RIs value is 0. For example, when the values of two CRI reports and/or the values of RIs in the two CSI reports are same, actually, only one CSI is valid. In such a case, the total number of layers from the UE report is the value of RI in only one of the first or second CSI report. If the values of CRIs in the two CSI reports are different, the two CSI reports are valid and the total number of layers from the UE report can be determined as the sum of the two actual RI values.

In one embodiment, if the number of ports for each CSI-RS resource in the CSI-RS resource set is P=1, the number of bits for CRI report in each CSI report is ceil(log 2(N)) and the number of bits for RI report in each CSI report is 0. If the two values of CRI in two CSI reports are same, the total number of RI from UE report is 1; if the two values of CRI in two CSI reports are different the total number of RI from UE report is 2.

In another embodiment, if the number of ports for each CSI-RS resource in the CSI-RS resource set is P=2, the number of bits for CRI report in each CSI report is ced(log 2M and the number of bits for RI report in the first CSI report is mina, ced(log 2($n_{RI}$)). For example, if the number of allowed RI values $n_{RI}$=1, the number of bits for RI report in each CSI report is 0. For another example, if the number of allowed RI values $n_{RI}$=2, the reported value of RI in each CSI reports may be an absolute RI value from {1, 2}, and the number of bits for RI report in each CSI report is 1. For a further example, if the number of allowed RI values $n_{RI}$=2, the reported value of RI in the first CSI report may be absolute value from {1, 2}, the number of bits for RI report in the first CSI report is 1, the reported value of RI in the second CSI report may be an offset value as shown in Table 2, Table 3 or Table 4, and the number of bits for RI report in the second CSI report may be 2, 2 or 1 respectively for Table 2, Table 3 or Table 4. For another example, if the number of allowed RI values $n_{RI}$=2, the reported value of RI for two CSI reports may be from at least one of {(1,1), (1,2), (2,1), (2,2)}, and the number of bits for RI combination report is 2. For a further example, if the number of allowed RI values $n_{RI}$=2, the reported value of RI for two CSI reports may be from at least one of {(1,1), (1,2), (2,2)} or from at least one of {(1,1), (2,1), (2,2)}, and the number of bits for RI combination report is 2.

In one embodiment, if the number of ports for each CSI-RS resource in the CSI-RS resource set is P=4, the number of bits for CRI report in each CSI report is ceil(log 2(N)). For example, if the number of allowed RI values $n_{RI}$=1, the number of bits for RI report in each CSI report is 0. For another example, if the number of allowed RI values $n_{RI}$=2, the reported value of RI in each CSI report may be an absolute RI value from two values of {1, 2, 3, 4}, and the number of bits for RI report in each CSI report is 1. For another example, if the number of allowed RI values $n_{RI}$=3 or 4, the reported value of RI in each CSI report may be an absolute RI value from 3 values or 4 values of {1, 2, 3, 4}, and the number of bits for RI report in each CSI report is 2. For another example, if the number of allowed RI values $n_{RI}$=2, the reported value of RI in the first CSI report may be absolute value from two values of {1, 2, 3, 4}, the number of bits for RI report in the first CSI report may be 1, the reported value of RI in the second CSI report may be an offset value as shown in Table 2, Table 3 or Table 4, and the number of bits for RI report in the second CSI report may be 2, 2 or 1 respectively for Table 2, Table 3 or Table 4. For another example, if the number of allowed RI values $n_{RI}$=3 or 4, the reported value of RI in the first CSI report may be absolute value from three or four values of {1, 2, 3, 4}, and the number of bits for RI report in the first CSI report may be 2, and the reported value of RI in the second CSI report may be an offset value as shown in Table 2, Table 3 or Table 4, and the number of bits for RI report in the second CSI report may be 2, 2 or 1 respectively for Table 2, Table 3 or Table 4. For another example, the reported of RI in two CSI reports may be a combination value, and the reported values of RI combination for two CSI reports may be from at least one of {(1,1), (1,2), (1,3), (1,4), (2,1), (2,2), (2,3), (2,4), (3,1), (3,2), (3,3), (3,4), (4,1), (4,2), (4,3), (4,4)} or from at least one of {(1,1), (1,2), (2,1), (2,2), (2,3), (3,2), (3,3), (3,4), (4,3), (4,4)}, and the number of bits for RI combination report is 4. For another example, the reported of RI in two CSI reports may be a combination value, and the reported value of RI combination for two CSI reports may be from at least one of {(1,1), (1,2), (1,3), (1,4), (2,1), (2,2), (2,3), (2,4), (3,3), (3,4), (4,4)} or from at least one of {(1,1), (2,1), (2,2), (3,1), (3,2), (3,3), (4,1), (4,2), (4,3), (4,4)}, and the number of bits for RI combination report is 4. For another example, the reported of RI in two CSI reports may be a combination value, the reported values of RI combination for two CSI reports may be from at least one of {(1,1), (1,2), (2,2), (2,3), (3,3), (3,4), (4,4)} or from at least one of {(1,1), (2,1), (2,2), (3,2), (3,3), (4,3), (4,4)}, and the number of bits for RI combination report is 3. In addition, based on the number of allowed RI values, the combination with restricted RI value can be excluded, and the number of bits for RI combination report can be further reduced.

In one embodiment, if the number of ports for each CSI-RS resource in the CSI-RS resource set is P>4, for example P may be 8, 12, 16, 24, or 32. The number of bits for CRI in each CSI report is ceil(log 2(N)). For example, if the number of allowed RI values $n_{RI}=1$, the number of bits for RI report in each CSI report is 0. For another example, if the number of allowed RI values $n_{RI}=2$, the reported value of RI in each CSI report may be an absolute RI value from two values of {1, 2, 3, 4, 5, 6, 7, 8}, and the number of bits for RI report in each CSI report is 1. For another example, if the number of allowed RI values $n_{RI}=3$ or 4, the reported value of RI in each CSI report may be an absolute RI value from 3 values or 4 values of {1, 2, 3, 4, 5, 6, 7, 8}, and the number of bits for RI report in each CSI report is 2. For a further example, if the number of allowed RI values $n_{RI}=5$ or 6 or 7 or 8, the reported value of RI in each CSI report may be an absolute RI value from 5 values or 6 values or 7 values or 8 values of {1, 2, 3, 4, 5, 6, 7, 8}, and the number of bits for RI report in each CSI report is 3. For another example, if the number of allowed RI values $n_{RI}=2$, the reported value of RI in the first CSI report may be absolute value from two values of {1, 2, 3, 4, 5, 6, 7, 8}, and the number of bits for RI report in the first CSI report may be 1; and the reported value of RI in the second CSI report may be an offset value as shown in Table 2, Table 3 or Table 4, and the number of bits for RI report in the second CSI report may be 2, 2 or 1 respectively for Table 2, Table 3 or Table 4. For another example, if the number of allowed RI values $n_{RI}=3$ or 4, the reported value of RI in the first CSI report may be absolute value from three or four values of {1, 2, 3, 4, 5, 6, 7, 8}, and the number of bits for RI report in the first CSI report may be 2, and the reported value of RI in the second CSI report may be an offset value as shown in Table 2, Table 3 or Table 4, and the number of bits for RI report in the second CSI report may be 2, 2 or 1 respectively for Table 2, Table 3 or Table 4. For another example, if the number of allowed RI values $n_{RI}=5$ or 6 or 7 or 8, the reported value of RI in the first CSI report may be absolute value from 5 values or 6 values or 7 values or 8 values of {1, 2, 3, 4, 5, 6, 7, 8}, and the number of bits for RI report in the first CSI report may be 3, and the reported value of RI in the second CSI report may be an offset value as shown in Table 2, Table 3 or Table 4, and the number of bits for RI report in the second CSI report may be 2, 2 or 1 respectively for Table 2, Table 3 or Table 4. For another example, the reported of RI in two CSI reports may be a combination value, and the reported value of RI combination for two CSI reports may be from at least one of {(1,1), (1,2), (1,3), (1,4), (2,1), (2,2), (2,3), (2,4), (3,1), (3,2), (3,3), (3,4), (4,1), (4,2), (4,3), (4,4)} or from at least one of {(1,1), (1,2), (2,1), (2,2), (2,3), (3,2), (3,3), (3,4), (4,3), (4,4)}, and the number of bits for RI combination report is 4. For another example, the reported of RI in two CSI reports may be a combination value, and the reported value of RI combination for two CSI reports may be from at least one of {(1,1), (1,2), (1,3), (1,4), (2,1), (2,2), (2,3), (2,4), (3,3), (3,4), (4,4)} or from at least one of {(1,1), (2,1), (2,2), (3,1), (3,2), (3,3), (4,1), (4,2), (4,3), (4,4)}, and the number of bits for RI combination report is 4. For another example, the reported of RI in two CSI reports may be a combination value, and the reported value of RI combination for two CSI reports may be from at least one of {(1,1), (1,2), (2,2), (2,3), (3,3), (3,4), (4,4)} or from at least one of {(1,1), (2,1), (2,2), (3,2), (3,3), (4,3), (4,4)}, and the number of bits for RI combination report is 3. In addition, based on the number of allowed RI values, the combination with restricted RI value can be excluded, and the number of bits for RI combination report can be further reduced.

In another aspect of the present disclosure, it further proposes a CSI reporting solution for beam sweeping. In the beam reporting, there is parameter "repetition" controlling beam sweeping modes. In a first mode, the parameter "repetition" is set as "on" and in such a case, the network device will use the same beam during the beam sweeping and the terminal device could select a reception beam. In a second mode, the parameter "repetition" is set as "off" and in such a case, the network device will use the different beams to transmit signaling during the beam sweep and the terminal device could select a transmission beam from the different beams used by the network device.

In the first mode, the reportQuantity reported by the terminal device could be "cri-RSRP", or "none" (nothing is reported); in the second mode, the terminal device could report "cri-RSRP." In current technologies, it requires that RSRP is always combined with CRI or SSBRI when it is reported, but when the parameter "repetition" is set as 'on', no CRI is reported. However, CSI reporting might be beneficial even when the parameter "repetition" is set as "on" since it could feed back the quality of the fixed transmission beam to the network device so that the network device could know the case when the fixed transmission beam does not have a desirable channel quality In some embodiments of the present disclosure, instead of cri-RSRP, a new reportQuantity could be used to report CSI when the parameter "repetition" is set as on. The new reportQuantity may contain information on "RSRP" or "SINR" to report the CSI when the parameter "repetition" is set as "on."

In some embodiments of the present disclosure, the terminal device uses the reportQuantity "cri-RSRP" to report CSI. The reportQuantity "cri-RSRP" may contain both information on measured CRI or SSBRI and RSRP; however, the network device will ignore the reported value of CRI or SSBRI and just obtain information on the reported value of RSRP when the parameter "repetition" is set as "on."

In some embodiments of the present disclosure, the terminal device still uses the reportQuantity "cri-RSRP" to report CSI. In such a case, the reportQuantity "cri-RSRP" contain both information part on CRI or SSBRI and RSRP; however, the information part on CRI or SSBRI just contains a default or fixed value (for example all zero or one for each bit for CRI or SSBRI) instead of the measured value when the parameter "repetition" is set as "on." In such a way, the network device could know based the default or fixed value that the report only contains useful RSRP information.

In some embodiments of the present disclosure, the terminal device still uses the report Quantity "cri-RSRP" to report CSI when the parameter "repetition" is set as "on," but the information part on CRI or SSBRI only uses one bit regardless of the number of resources within one set. In such a way, the CSI report could have a lower signaling overhead.

In some embodiments of the present disclosure, for multiple-TRP transmission, multiple CSI reports on multiple TRPs shall be transmitted for each CSI-RS resource set and the CSI-RS resource set could be divided into a multiple resource subsets. For example, for 2 TRP transmission, one CI-RS resource set including N CSI-RS could be divided into two CSI-RS resource subset each having N/2 CSI-RS resource. A first subset of the CSI-RS resource subsets can be used for CSI acquisition of the first TRP and a second subset of the CSI-RS subsets can be used for CSI acquisition of the second TRP. In such a case, it only need a half of bitwidth for CRI and therefore the bitwidth for CRI in Table 1 will become log 2(N/2).

TABLE 5

CSI report structure in NR system

| Field | Bitwidth |
| --- | --- |
| Rank Indicator | $\min(2, \lceil \log_2 n_{RI} \rceil)$ if reported |
| Layer Indicator | $\min(2, \lceil \log_2 RI \rceil)$ if reported |
| Wide-band CQI | 4 if reported |
| Sub-band differential CQI | 2 if reported |
| CRI | $\log_2(N/2)$ |

Figure 6:
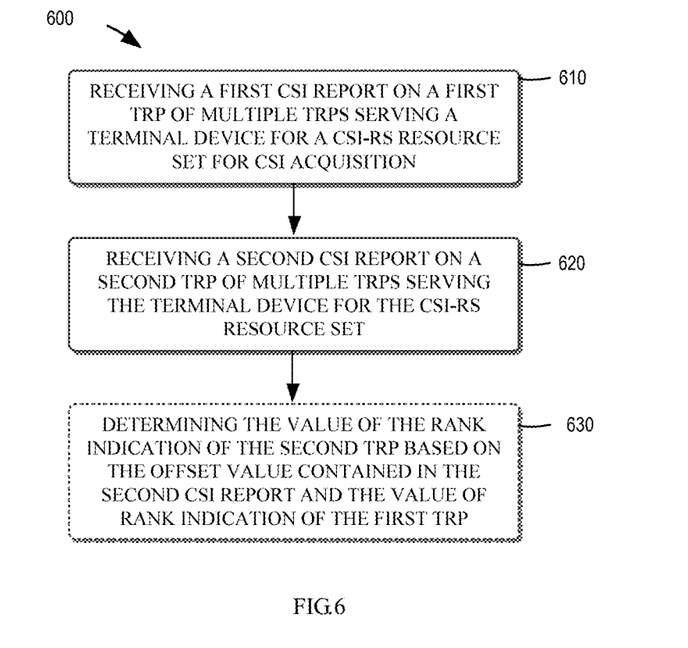
FIG. 6 illustrates a flow chart of a method for receiving a CSI report for multiple TRP transmission at a network device according to some embodiments of the present disclosure.

FIG. 6 schematically illustrates a flow chart of a method for receiving a CSI report at a network device according to some embodiments of the present disclosure. The method 600 may be performed at a network device, for example a base station like gNB, or other like devices.

As illustrated in FIG. 6, first in step 610, the network device may receive a first CSI report on a first TRP of multiple TRPs serving a terminal device for a CSI-RS resource set for CSI acquisition.

As mentioned hereinabove, CSI reporting can be configured by the network device. For example, the CSI report could be transmitted periodically, or alternatively, the CSI report could be transmitted upon receipt of a reporting request from the network device. After the terminal device performs CSI measurement using selected CSI-RS resource for each TRP, it could obtain CSI information for each TRP. For the one CSI-RS resource set for CSI acquisition, the terminal device can transmit multiple sets of CSI reports for multiple TRPs, one report per TRP.

Thus, the network device may receive a first CSI report on the first TRP. The first CSI report could include CRI and RI for the first TRP. In some embodiments of the present disclosure, the CSI report may also include any of PMI, CQI, and LI, etc., for the first TRP.

Next, in step 620, the network device receives a second CSI report on a second TRP of multiple TRPs serving the terminal device for the CSI-RS resource set. Similar to the first CSI report, the second CSI report could include CRI and rank indication RI for the second TRP. In some embodiments of the present disclosure, the CSI report may also include any of PMI, CQI, layer indication, etc., for the second TRP.

In some embodiment of the present disclosure, the first CSI report may contain a value of RI for the first TRP and the second CSI report may use an offset value relative to the value of RI for the first TRP to indicate a value of RI for the second TRP. By this means, it is possible to reduce the signaling overhead of the CSI report. In such embodiments, the network device may further determine, in step 630, the value of the rank indication on the second TRP based on the offset value and the value of rank indication on the first TRP.

In some embodiments of the present disclosure, the offset value may indicate a value of rank indication on the second TRP higher than, lower than or equal to the value of rank indication on the first TRP. For some detailed description of offset value indication, one may refer to content regarding to Table 2.

In some embodiments of the present disclosure, the offset value may indicate a value of rank indication on the second TRP lower than or equal to the value of rank indication on the first TRP. In some embodiments of the present disclosure, the offset value may indicate a value of rank indication on the second TRP higher than or equal to the value of rank indication on the first TRP. For some detailed description of offset value indication, one may refer to content regarding to Tables 3 to 4.

In some embodiments of the present disclosure, the CSI-RS resource set can be divided into multiple CSI-RS resource subsets for the multiple TRPs, and wherein a first subset of the CSI-RS resource subsets is used for CSI acquisition of the first TRP and a second subset of the CSI-RS subsets is used for CSI acquisition of the second TRP. For some detailed description of offset value indication, one may refer to content regarding to Table 5.

Hereinabove, example methods of receiving CSI reporting for multiple TRP transmission at the network side are described in brief hereinbefore with reference to FIG. 6. However, it can be understood that operations at the network device are substantially corresponding to those at the terminal device and thus for some details of operations, one may refer to description with reference to FIGS. 2 to 5.

Figure 7:
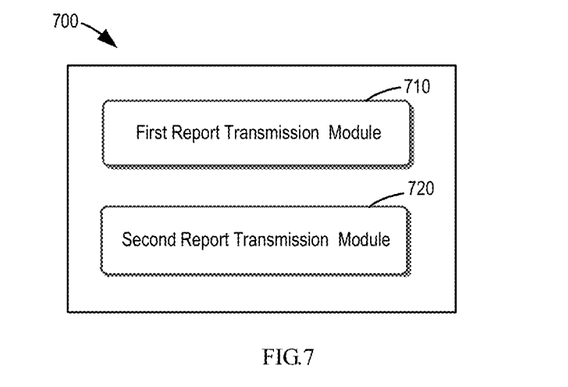
FIG. 7 schematically illustrates a block diagram of an apparatus for transmitting a CSI report at a terminal device according to some embodiments of the present disclosure.

FIG. 7 schematically illustrates a block diagram of an apparatus for transmitting a CSI report for multiple TRP transmission at a terminal device according to some embodiments of the present disclosure. The apparatus 700 may be implemented at a terminal device, for example UE or other like terminal devices.

As illustrated in FIG. 700, the apparatus 700 may include a first CSI report transmission module 710 and a second CSI report transmission report 720. The first CSI report transmission module 710 may be configured to transmit a first CSI report on a first TRP of multiple TRPs serving a terminal device for a channel state information reference signal (CSI-RS) resource set for CSI acquisition. The second CSI report transmission report 720 can be configured to transmit a second CSI report on a second TRP of the multiple TRPs serving the terminal device for the CSI-RS resource set.

In some embodiments of the present disclosure, the first CSI report may contain a first rank indication on the first TRP and the second CSI report may contain a second rank indication on the second TRP, and wherein the first rank indication may indicate a value of rank indication on the first TRP and the second rank indication may indicate an offset value relative to the value of rank indication on the first TRP.

In some embodiments of the present disclosure, the offset value may indicate a value of rank indication on the second TRP higher than, lower than or equal to the value of rank indication on the first TRP.

In some embodiments of the present disclosure, one of the multiple TRPs with a larger value of rank indication may be determined as the first TRP, and wherein the offset value may indicate a value of rank indication on the second TRP lower than or equal to the value of rank indication on the first TRP.

In some embodiments of the present disclosure, one of the multiple TRPs with a smaller value of rank indication may be determined as the first TRP, and wherein the offset value may indicate a value of rank indication on the second TRP higher than or equal to the value of rank indication on the first TRP.

In some embodiments of the present disclosure, the CSI-RS resource set may be divided into multiple CSI-RS resource subsets for the multiple TRPs, and wherein a first subset of the CSI-RS resource subsets may be used for CSI acquisition of the first TRP and a second subset of the CSI-RS subsets may be used for CSI acquisition of the second TRP.

In some embodiments of the present disclosure, each of the first and second CSI reports may include one or more of: CSI-RS resource indication; rank indication; precoding matrix indicator; channel quality indicator; and layer indication.

Figure 8:
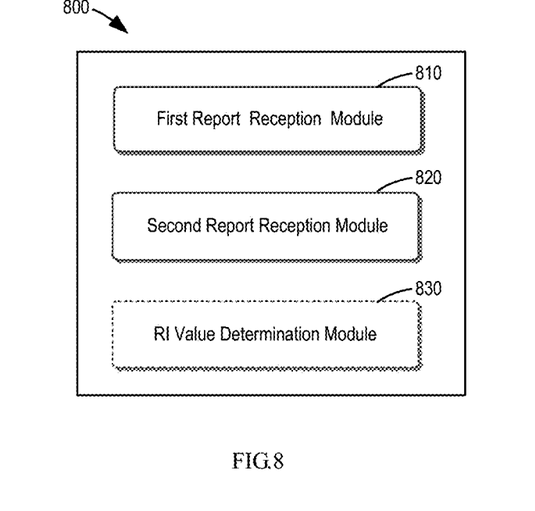
FIG. 8 schematically illustrates a block diagram of an apparatus for receiving a CSI report at a network device according to some embodiments of the present disclosure.

FIG. 8 schematically illustrates a block diagram of an apparatus for receiving a CSI report for multiple TRP transmission at a terminal device according to some embodiments of the present disclosure. The Apparatus 800 could be implemented on the network device or node for example gNB, or other like network devices.

As illustrated in FIG. 8, apparatus 800 may include a first CSI report reception module 810 and a second CSI report reception module 820. The first CSI report reception module 810 may be configured to receive a first CSI report on a first TRP of multiple TRPs serving a terminal device for a channel state information reference signal (CSI-RS) resource set for CSI acquisition. The second CSI report reception module 820 may be configured to receive a second CSI report on a second TRP of multiple TRPs serving the terminal device for the CSI-RS resource set.

In some embodiments of the present disclosure, the first CSI report may contain a first rank indication on the first TRP and the second CSI report may contain a second rank indication on the second TRP, and wherein the first rank indication indicates a value of rank indication on the first TRP and the second rank indication indicates an offset value relative to the value of rank indication on the first TRP. In these embodiments, apparatus 800 may further include a RI value determination module 830 which can be configured to determine the value of the rank indication on the second TRP based on the offset value and the value of rank indication on the first TRP.

In some embodiments of the present disclosure, the offset value may indicate a value of rank indication on the second TRP higher than, lower than or equal to the value of rank indication on the first TRP.

In some embodiments of the present disclosure, the offset value may indicate a value of rank indication on the second TRP lower than or equal to the value of rank indication on the first TRP.

In some embodiments of the present disclosure, the offset value may indicate a value of rank indication on the second TRP higher than or equal to the value of rank indication on the first TRP.

In some embodiments of the present disclosure, the CSI-RS resource set may be divided into multiple CSI-RS resource subsets for the multiple TRPs, and wherein a first subset of the CSI-RS resource subsets may be used for CSI acquisition of the first TRP and a second subset of the CSI-RS subsets may be used for CSI acquisition of the second TRP.

In some embodiments of the present disclosure, each of the first and second CSI reports may include one or more of: CSI-RS resource indication; rank indication; precoding matrix indicator; channel quality indicator; and layer indication.

Hereinbefore, apparatuses 700 and 800 are described with reference to FIGS. 7 and 8 in brief. It can be noted that the apparatuses 700 to 800 may be configured to implement functionalities as described with reference to FIGS. 2 to 6. Therefore, for details about the operations of modules in these apparatuses, one may refer to those descriptions made with respect to the respective steps of the methods with reference to FIGS. 2 to 6.

It is further noted that components of apparatuses 700 and 800 may be embodied in hardware, software, firmware, and/or any combination thereof. For example, the components of apparatuses 700 and 800 may be respectively implemented by a circuit, a processor or any other appropriate selection device.

Those skilled in the art will appreciate that the aforesaid examples are only for illustration not limitation and the present disclosure is not limited thereto; one can readily conceive many variations, additions, deletions and modifications from the teaching provided herein and all these variations, additions, deletions and modifications fall the protection scope of the present disclosure.

In addition, in some embodiment of the present disclosure, apparatuses 700 and 800 may include at least one processor. The at least one processor suitable for use with embodiments of the present disclosure may include, by way of example, both general and special purpose processors already known or developed in the future. Apparatuses 700 and 800 may further include at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 700 and 800 to at least perform operations according to the method as discussed with reference to FIGS. 2 to 6 respectively.

Figure 9:
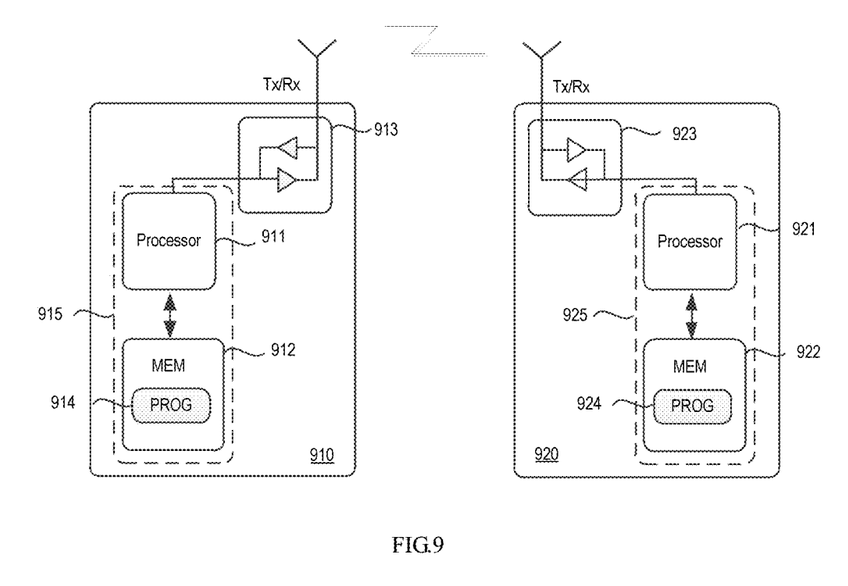
FIG. 9 schematically illustrates a simplified block diagram of an apparatus 910 that may be embodied as or comprised in a terminal device like UE, and an apparatus 920 that may be embodied as or comprised in a network device like gNB as described herein.

FIG. 9 schematically illustrates a simplified block diagram of an apparatus 910 that may be embodied as or comprised in a terminal device like UE, and an apparatus 920 that may be embodied as or comprised in a network device like gNB as described herein.

The apparatus 910 comprises at least one processor 911, such as a data processor (DP) and at least one memory (MEM) 912 coupled to the processor 911. The apparatus 910 may further include a transmitter TX and receiver RX 913 coupled to the processor 911, which may be operable to communicatively connect to the apparatus 920. The MEM 912 stores a program (PROG) 914. The PROG 914 may include instructions that, when executed on the associated processor 911, enable the apparatus 910 to operate in accordance with embodiments of the present disclosure, for example method 200. A combination of the at least one processor 911 and the at least one MEM 912 may form processing means 915 adapted to implement various embodiments of the present disclosure.

The apparatus 920 comprises at least one processor 911, such as a DP, and at least one MEM 922 coupled to the processor 911. The apparatus 920 may further include a suitable TX/RX 923 coupled to the processor 921, which may be operable for wireless communication with the apparatus 910. The MEM 922 stores a PROG 924. The PROG 924 may include instructions that, when executed on the associated processor 921, enable the apparatus 920 to operate in accordance with the embodiments of the present disclosure, for example to perform method 600. A combination of the at least one processor 921 and the at least one MEM 922 may form processing means 925 adapted to implement various embodiments of the present disclosure.

Various embodiments of the present disclosure may be implemented by computer program executable by one or more of the processors 911, 921, software, firmware, hardware or in a combination thereof.

The MEMs 912 and 922 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 911 and 921 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a terminal device, the method comprising:
receiving, from a network device, a configuration for a Channel State Information (CSI) report; and
transmitting, to the network device, the CSI report, wherein the CSI report comprises a first rank indication (RI) and a second RI, the first RI is associated to a first channel state information reference signal (CSI-RS) resource subset of a CSI-RS resource set, the second RI is associated to a second CSI-RS resource subset of the CSI-RS resource set, and the first RI and the second RI are reported with a combination value corresponding to one of $\{(1,1), (1,2), (2,1), (2,2)\}$,
wherein the CSI report further comprises a first precoding matrix indicator (PMI) associated with the first CSI-RS resource subset and a second PMI associated with the second CSI-RS resource set.

2. The method of claim 1, wherein the CSI report further comprises a first layer indication (LI) associated with the first CSI-RS resource subset and a second LI associated with the second CSI-RS resource set.

3. A terminal device, comprising:
a transceiver, and
a processor, configured to perform or control the transceiver to perform the method of claim 1.

4. A method performed by a network device, the method comprising:
transmitting, to a terminal device, a configuration for a Channel State Information (CSI) report; and
receiving, from the terminal device, the CSI report, wherein the CSI report comprises a first rank indication (RI) and a second RI, the first RI is associated to a first channel state information reference signal (CSI-RS) resource subset of a CSI-RS resource set, the second RI is associated to a second CSI-RS resource subset of the CSI-RS resource set, and the first RI and the second RI are reported with a combination value corresponding to one of $\{(1,1), (1,2), (2,1), (2,2)\}$,
wherein the CSI report further comprises a first precoding matrix indicator (PMI) associated with the first CSI-RS resource subset and a second PMI associated with the second CSI-RS resource set.

5. The method of claim 4, wherein the CSI report further comprises a first layer indication (LI) associated with the first CSI-RS resource subset and a second LI associated with the second CSI-RS resource set.

* * * * *

UNITED STATES PATENT AND TRADEMARK OFFICE
CERTIFICATE OF CORRECTION

| | | |
|---|---|---|
| PATENT NO. | : 11,552,687 B2 | Page 1 of 1 |
| APPLICATION NO. | : 17/252117 | |
| DATED | : January 10, 2023 | |
| INVENTOR(S) | : Yukai Gao and Gang Wang | |

It is certified that error appears in the above-identified patent and that said Letters Patent is hereby corrected as shown below:

In the Claims

Column 18, Line 40: Claim 1, Please replace "set" with --subset--

Column 18, Line 44: Claim 2, Please replace "set" with --subset--

Column 18, Line 65: Claim 4, Please replace "set" with --subset--

Column 19, Line 2: Claim 5, Please replace "set" with --subset--

Signed and Sealed this
Twenty-first Day of May, 2024

Katherine Kelly Vidal
*Director of the United States Patent and Trademark Office*